United States Patent [19]
Nicponski

[11] Patent Number: 5,974,189
[45] Date of Patent: Oct. 26, 1999

[54] METHOD AND APPARATUS FOR MODIFYING ELECTRONIC IMAGE DATA

[75] Inventor: Henry Nicponski, Albion, N.Y.

[73] Assignee: Eastman Kodak Company, Rochester, N.Y.

[21] Appl. No.: 08/066,273

[22] Filed: May 24, 1993

[51] Int. Cl.$^6$ .................................................. G06T 5/00
[52] U.S. Cl. ............................................ 382/254; 382/309
[58] Field of Search ............................. 382/54, 1, 41, 382/254, 309; 395/126; 358/452, 453, 22; 345/418, 426

[56] References Cited

U.S. PATENT DOCUMENTS

| | | | |
|---|---|---|---|
| 3,441,789 | 4/1969 | Harrison, III | 345/426 |
| 3,602,702 | 8/1971 | Warnock | 345/426 |
| 3,621,214 | 11/1971 | Romney | 345/421 |
| 3,736,564 | 5/1973 | Watkins | 345/421 |
| 4,689,681 | 8/1987 | Jackson | 348/590 |
| 4,709,231 | 11/1987 | Sakaibara et al. | 345/426 |
| 4,835,712 | 5/1989 | Drebin et al. | 345/426 |
| 4,862,391 | 8/1989 | Ohhashi | 345/426 |
| 4,866,637 | 9/1989 | Gonzalez-Lopez | 345/426 |
| 4,899,295 | 2/1990 | Nonweiler | 345/426 |
| 4,901,064 | 2/1990 | Deering | 345/426 |
| 4,928,250 | 5/1990 | Greenberg et al. | 345/426 |
| 4,943,938 | 7/1990 | Aoshima et al. | 345/422 |
| 4,965,844 | 10/1990 | Oka et al. | 382/793 |
| 5,043,922 | 8/1991 | Matsumoto | 345/422 |
| 5,046,108 | 9/1991 | Inoue et al. | 345/426 |
| 5,067,098 | 11/1991 | Moellering et al. | 345/426 |
| 5,083,287 | 1/1992 | Obata et al. | 345/426 |
| 5,103,217 | 4/1992 | Cawley | 345/429 |
| 5,163,126 | 11/1992 | Einkauf et al. | 345/423 |

OTHER PUBLICATIONS

Nakamae et al. "Compositing 3D Images with Antialiasing and Various Shading Effects" IEEE Computer Graphics and Applications, vol. 9, No. 2, pp. 21–29, Mar. 1989.

*Primary Examiner*—Jon Chang
*Attorney, Agent, or Firm*—Francis H. Boos, Jr.

[57] ABSTRACT

An electronic reproduction apparatus is provided with a modeling routine that includes the steps of identifying a portion of an electronic image to be modified; defining an optical axis, a projection point, a density contour shape and a density gradient profile within the portion of the electronic image to be modified; and calculating modified image data values based on the optical axis, projection point, density contour shape and density gradient profile; applying the modified image data values the portion of the electronic image to be modified. The modified image data is calculated using a cubic spline interpolation. The modeling routine enables the production of smooth and natural contours and gradients required to create common enhancement effects such as shadows, glows, highlights and vignettes.

1 Claim, 7 Drawing Sheets

FIG.9

METHOD AND APPARATUS FOR MODIFYING ELECTRONIC IMAGE DATA

FIELD OF THE INVENTION

The present invention relates generally to image reproduction apparatus. More specifically, the invention relates to an apparatus that produces a hard copy reproduction of a displayed video image wherein the apparatus includes a mechanism for modifying the displayed image to produce a more aesthetically pleasing reproduction.

BACKGROUND OF THE INVENTION

Systems are commercially available that permit an operator to edit or modify the color and composition of an original image to form a more aesthetically pleasing reproduction of the image in hard copy form. One example of such a system is the KODAK PREMIER Image Enhancement System manufactured by the Eastman Kodak Company of Rochester, N.Y. The KODAK PREMIER Image Enhancement System incorporates a film reader unit to digitally scan original images in the form of negatives, transparencies or lithographic film and display the scanned original images at an operator workstation which includes a monitor, keyboard, and digitizing tablet, with accompanying stylus, coupled to a processing unit. An operator can utilize the workstation to alter the original images by cropping, rotating, resizing, changing the color balance, or performing a multitude of other manipulation functions. The altered original images are then reproduced in hard copy form by a writing unit.

In addition to the features listed above, it is also desirable to incorporate an interactive electronic "airbrush" manipulation function within the system, i.e., a function that permits the operator to retouch the original image displayed in video form on the monitor of the workstation in a manner similar to conventional airbrushing of photographic negatives or prints. The operator can use the airbrush function to lighten, darken, change the contrast, or add color to selected areas of the displayed image. U.S. Pat. No. 5,276,510 entitled "Airbrush Modeling Routine for an Electric Image Reproduction System", for example, discloses an airbrush modeling routine that closely models the operation of a conventional airbrush in both function and result.

It has been found that conventional electronic image reproduction systems are not adequate for use in producing a variety of common image enhancement effects such as shadows, glows, highlights and vignettes. The best an operator can presently hope to accomplish is to use an airbrush function as described above in an attempt to manually create a reasonably smooth gradation in an image. Even the most experienced users, however, find it very difficult to create smooth, natural contours and gradients manually.

In view of the above, it is an object of the invention to provide an electronic image reproduction apparatus that is capable of producing smooth and natural contours and gradients required to create common enhancement effects such as shadows, glows, highlights and vignettes.

SUMMARY OF THE INVENTION

The invention provides a modeling routine for an electronic image reproduction apparatus that includes the steps of identifying a portion of an electronic image to be modified; defining an optical axis, a projection point, a density contour shape and a density gradient profile within the portion of the electronic image to be. modified; and calculating modified image data values based on the optical axis, projection point, density contour shape and density gradient profile; applying the modified image data values the portion of the electronic image to be modified. The modeling routine enables the production of smooth and natural contours and gradients required to create common enhancement effects such as shadows, glows, highlights and vignettes.

BRIEF DESCRIPTION OF THE DRAWINGS

Reference should now be made to the following detailed description of the preferred embodiments and the accompanying drawings, wherein.

DETAILED DESCRIPTION OF THE PREFERRED EMBODIMENTS

Figure 1:
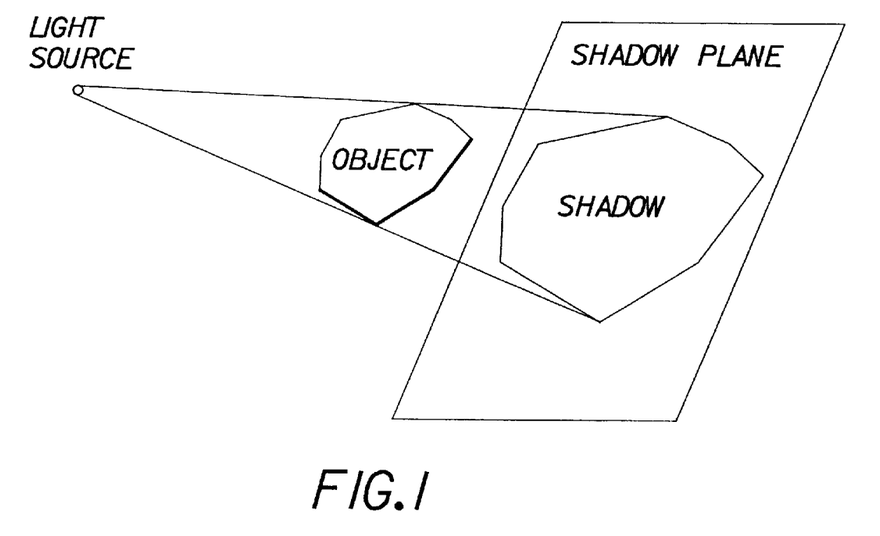
FIG. 1 illustrates a simple configuration of a single light source and an object that forms a shadow on a plane.
Figure 2:
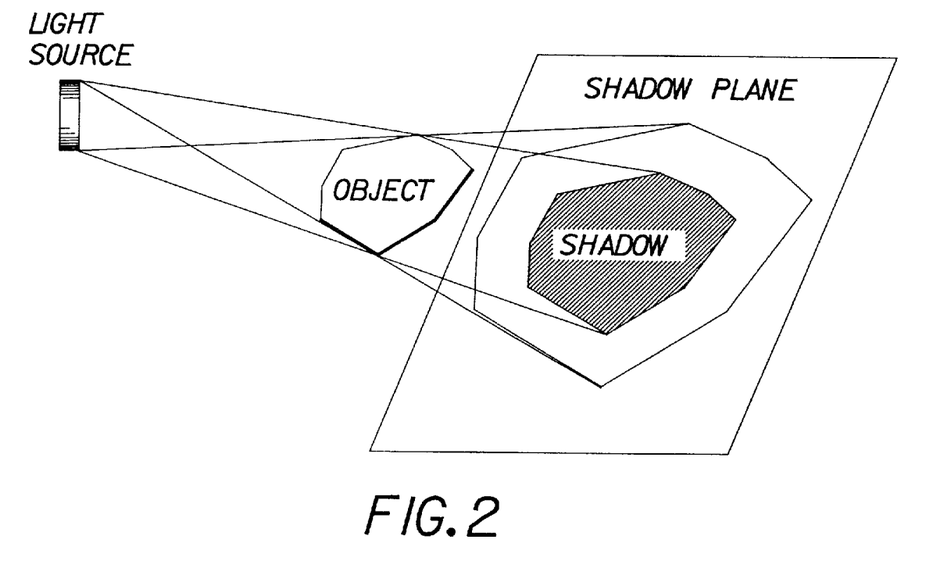
FIG. 2 illustrates a configuration of an extended light source and an object that forms a shadow on a plane.

A further explanation of the problems addressed by the invention are illustrated by FIGS. 1 and 2. FIG. 1 shows the simplest possible configuration of a light source and an object that results in a shadow. The light source is a point source and the shadow falls on a plane. The shadow will have a constant density and sharp edges, and the shape of the shadow will be a planar geometric projection of the shape of the objection. The illustrated configuration rarely occurs in real life images, although some images, such as carefully lit studio scenes or natural scenes with very harsh, direct sunlight and low object reflectance, may approximate the configuration of FIG. 1.

A more realistic scene that includes a single light source of a more extended character is illustrated in FIG. 2. The illustrated scene resembles a solar eclipse, in that areas of total obstruction of the light source and other areas of partial obstruction are included. Thus, the shaded area in the illustration represents the region in which no light from the extended source may fall, while the surrounding region receives light from increasing portions of the source until, at the outer boundary, the entire source can again reach the shadow plane with full illumination.

The situation in FIG. 2 can be generalized in several more ways. For example, a real world scene might contain several extended and/or area light sources. The multiple sources will in general produce illumination with different intensity and spectral characteristics. The objects in the scene may reflect or transmit some portion of the light incident upon them, after causing a change in the spectral makeup of the light due to their color. Furthermore, the reflectance or transmittance of the objects will have a micro-structure determined by their surface textures and finishes. The shadow surface may be non-planar, and the degree of non-homogeneous surface characteristics it possesses influences the shadow as well. The general problem of photo-realistic scene rendering is thus encountered.

The present invention provides a modeling routine for producing realistic shadow and other effects that is based on three principles. First, a scene composer can usually predict the shape of the shadow fairly well in advance in most situations, given a knowledge of the lighting sources, the object shapes and the geometry of the shadow surfaces. Second, the shadows will contain density gradients which relate to the nature of the light sources and will be influenced by nearby reflecting or transmitting objects as well as ambient scene lighting. Third, it is commonly recognized that shadows are also projections of shapes by prominent light sources, for example, the lengthening of one's shadow in the early morning and afternoon hours.

In a system incorporating a modeling routine based on the principles outlined above, the operator estimates the shape of the shadow, gives an approximation to the profile of the density gradient, and specifies a point representing the center of projection if a projected shadow is desired. The components provided by the operator, along with parameters related to the range of densities and a desired noise level of the shadow, which will be discussed in greater detail below, form the basis of a series of mathematical computations for modifying image data, for example, in the form of a grey scale gradated mask. The mask is then used to create a shadow in an image by allowing it, for example, to modulate the application of a neutral density change.

Before proceeding further, it is necessary to define what is meant by the "shape" of the shadow. In FIG. 1, the shadow possesses a clearly defined shape, which happens to be a planar geometric projection of the outline of the an object. The shadow has a constant density and a sharp edge. In FIG. 2, however, the shadow contains varying levels of density. In the latter case, the shape of the shadow is defined to be a set of contours of constant density, in much the same way that the contours of constant elevation describe the shape of a mountain on a topographical map. The contours of constant density provide a clear representation of the appearance of the shadow and the effect of the shadow on the surface on which it falls.

Density contours in real-world shadows tend to resemble fairly smoothly varying curved shapes. The multiplicity of light sources, ambient light, and object reflectance and transmittance work together to produce shadows that in very many instances tend not to have density contours with sharp corners or discontinuities. Thus, a single contour of constant density can be specified by designating points along the contour in the context of the image of interest.

The basic steps of a modeling routine in accordance with the invention will now be described. An operator designates points along a contour of an image or portion of an image of interest that is displayed on a monitor. The points designated by the operator are treated as fixed known points for a piecewise cubic spline approximation to the contour. As the points are defined, the contour is displayed on the monitor for immediate operator feedback and correction. The operator can add and delete points as needed to define the desired contour. The cubic spline approximation has the property of continuous values and first and second derivatives at the knot points. To the human eye, such a shape has no visible kinks or uneven appearances.

The operator then defines the geometry of the scene lighting. In the illustrated example, a single point light source is utilized, although it will be understood that other types of light sources can be readily modeled. The source is placed at a finite distance from an object or at infinity, by having the user specify two points along an optical axis. The two points represent the points of highest and lowest density. All points in the shadow that are closer to the light source than the point of highest density will also be of the same highest density, while points that are farther from the light source than the point of lowest density will also be of the same lowest density (preferably zero). Shadow points that are intermediate between the points of highest and lowest density are at an intermediate density.

The operator must also designate the location of the light source and a point used as the center of the shadow projection. The projection point is constrained to fall on the optical axis and must be beyond the highest density point on the side away from the lowest density point if the light source is at a finite distance from the object. The significance of the projection point lies in its relationship to the density contour specified by the operator. Since the operator specifies only a single density contour (hereinafter referred to as the reference contour), means must be provided to compute the location of the other density contours. The reference contour is projected incrementally with the center of the projection at the projection point. Computed contours closer to the projection point are smaller than the reference contour, while other contours further from the projection point are larger than the reference contour (unless the projection point is at infinity).

Figure 3:
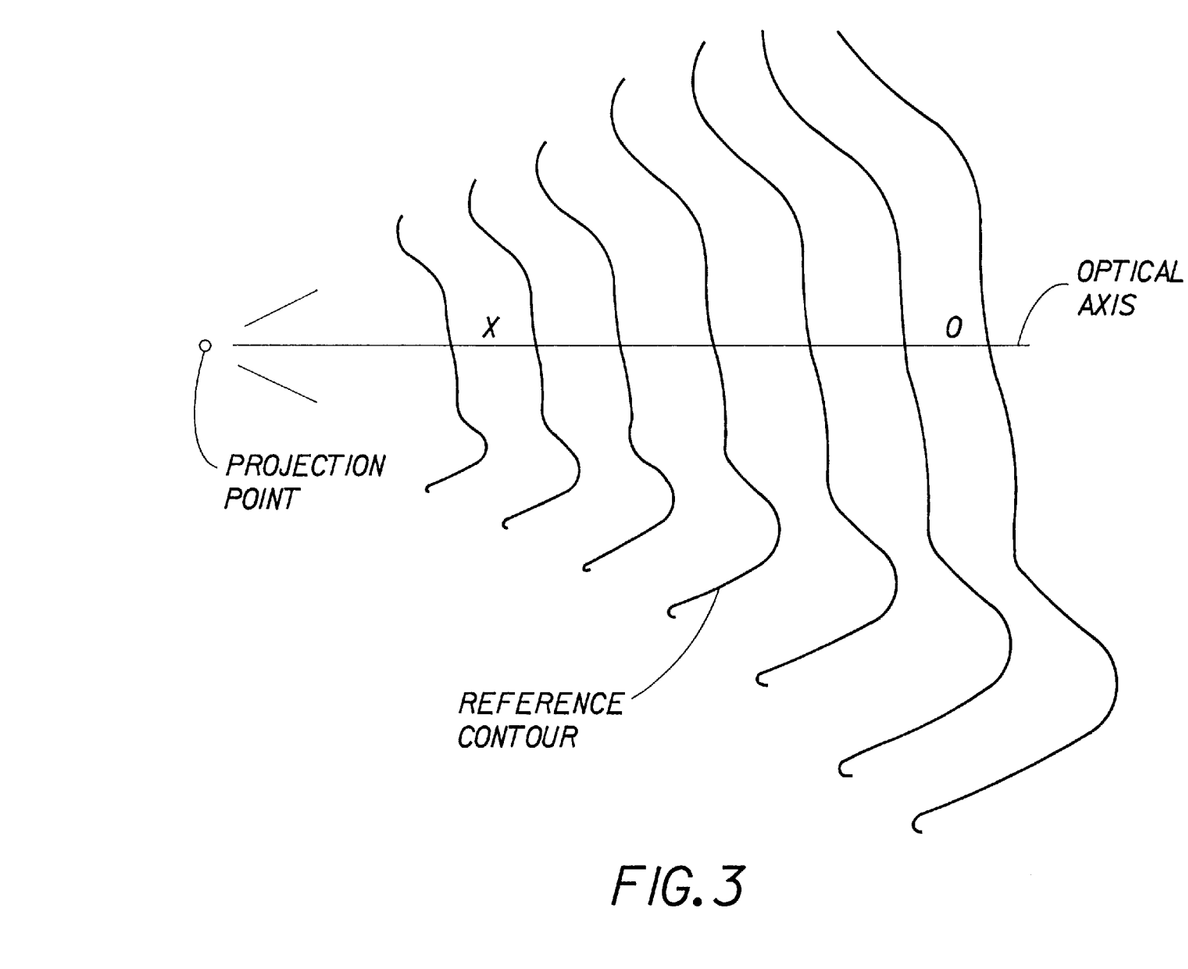
FIG. 3 illustrates a shadow contour projection with the projection point at a finite distance.
Figure 4:
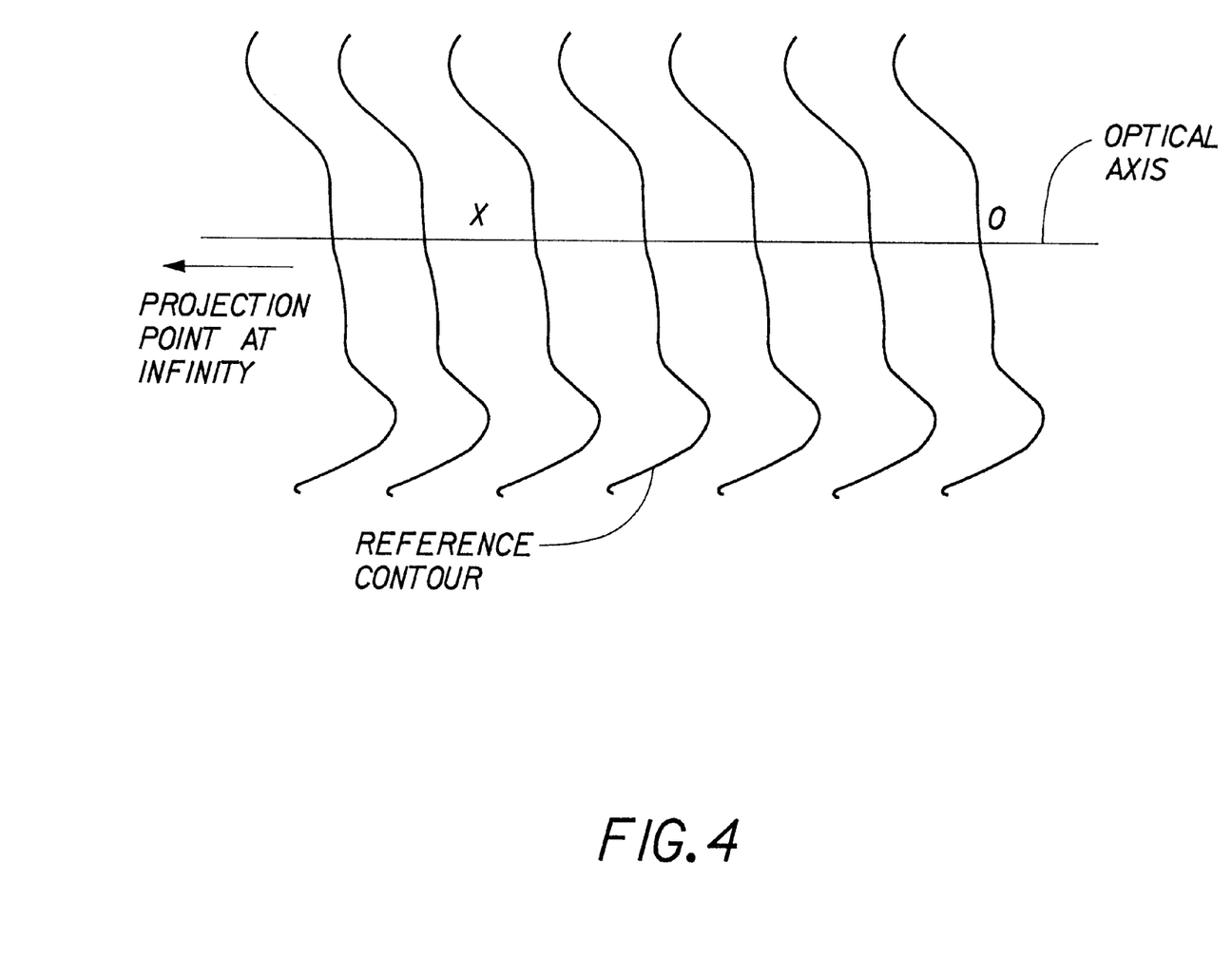
FIG. 4 illustrates a shadow contour projection with a projection point at infinity.

FIG. 3 illustrates the concepts discussed above. Each of the contours illustrated in FIG. 3 represent points in a shadow that are of equal density. The "X" marks the point of highest density and the "O" marks the point of lowest density. A reference contour is projected incremental with the center of projection at the projection point. Computed contours are generated, as will be described in greater detail below, based on the reference contour. Those contours closer to the projection point are smaller in scale than the reference contour, while those contours further from the projection point are larger than the reference contour. If the projection point is at infinity, the series of contours would be of equal size and in a parallel orientation, all having the same relation to the optical axis, as illustrated in FIG. 4.

The operator must now specify the nature of the density change between the points of highest and lowest density. In a preferred embodiment, the operator specifies a piecewise second order polynomial with continuous first order derivatives to form the density gradient along the optical axis. The selected mechanism is a set of density points that are moved along the optical axis and placed between the points of highest and lowest densities through the use of an input devices such as a mouse, keyboard or stylus pen. Once the points have been placed, the optical axis intervals so created are then construed to define equal changes in density. The density of every shadow point can then be computed by recognizing that every point falls on a density contour, and each density contour can be traced until it intersects with the optical axis. The density value at the point of intersection is necessarily the proper density value to assign to the shadow point, since the density contours are defined to be of constant density.

Figure 5:
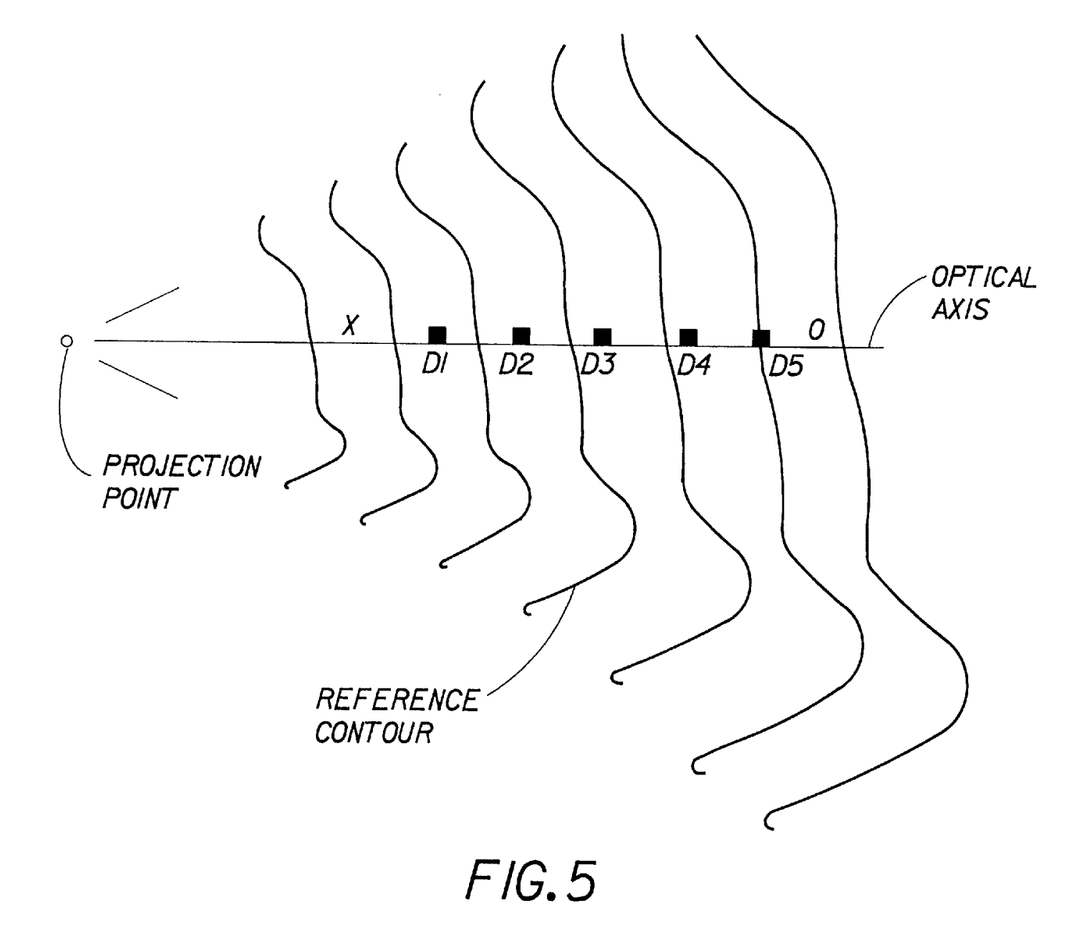
FIG. 5 illustrates a contour projection with linear gradient density points.
Figure 6:
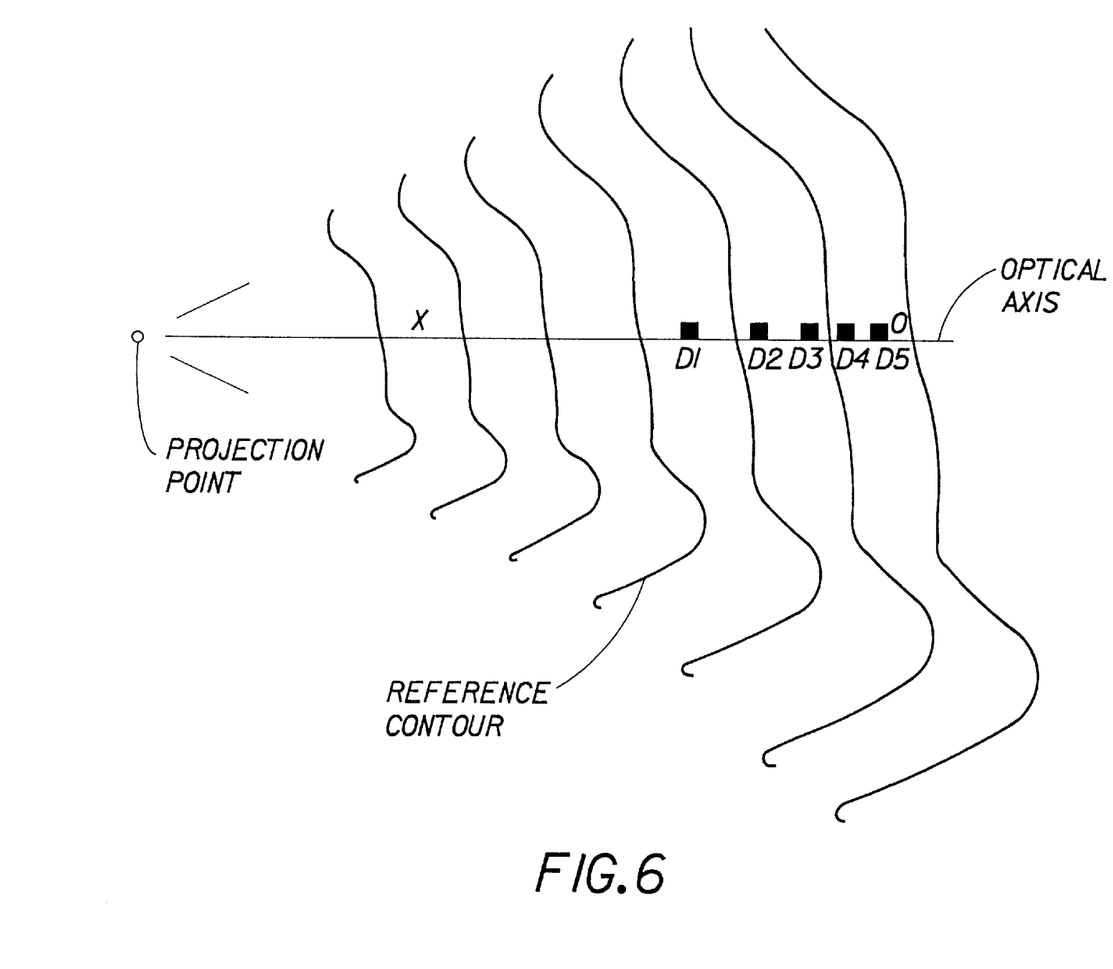
FIG. 6 illustrates a contour projection with non-linear density gradient points.

FIGS. 5 and 6 depict the creation of a density gradient function for the shadow contours shown in FIG. 3. In FIG. 5, a default linear density gradient is represented by equally spaced density points (D1–D5). In FIG. 6, the operator has located the density points so that most of the change in density occurs near the point of lowest density. The scenario illustrated in FIG. 6 is typical of many shadows in real scenes that result from geometries similar to that illustrated in FIG. 2. It should be noted that the contours in FIGS. 5 and 6 illustrate the shape of the shadow but do not represent constant intervals in density, which are represented by the density points (D1–D5). The contours passing through each density point could readily be illustrated, in which case each contour line would represent a change in density. In any case, it will be understood that each point in the shadow falls on exactly one contour line, and each contour line intersects the optical axis in exactly one place which determines the density of the shadow all along that contour.

Experimentation has shown that a shadow generated based on the above described modeling process exhibits an unrealistic degree of uniformity. Viewing of such a shadow by an operator results in the presence of apparent psychophysically induced artifacts resembling quantization contouring. It is therefore preferably to introduce a degree of noise to avoid the artifacts. The noise value can be derived from a random number generator and superimposed over the density profile that would otherwise be computed by the modelling routine. The user preferably has control over the level of noise to be added to the shadow, as some scenes may already contain enough variability in the image information.

Figure 7:
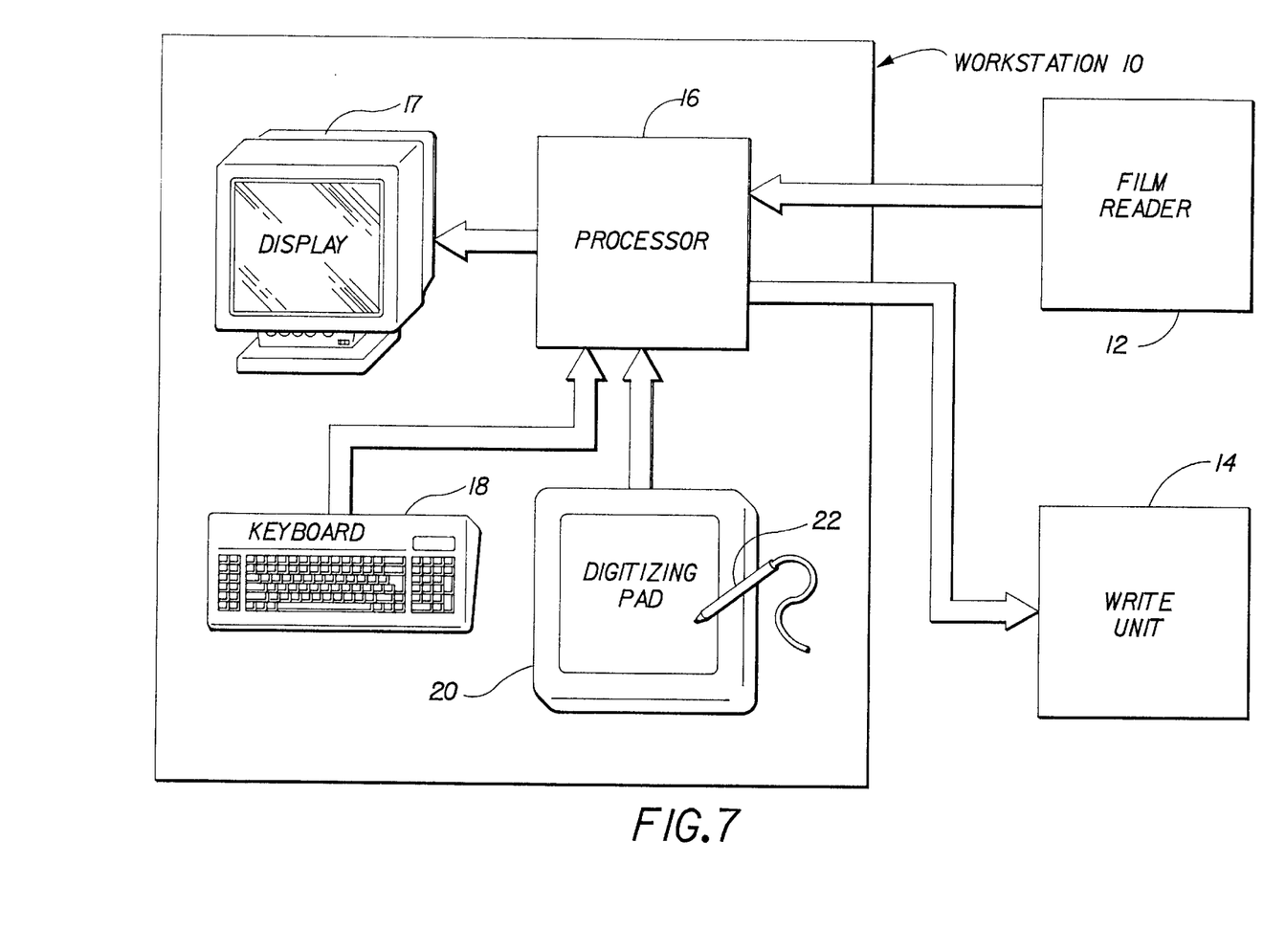
FIG. 7 is a block diagram of an image reproduction system incorporating the shadow modeling routine of the present invention.

The implementation of the modeling routine will now be described with reference to FIG. 7, which illustrates an electronic image reproduction system, for example the above-described KODAK PREMIER Image Enhancement System, that includes a workstation unit 10, coupled to a film reader unit 12, and a write unit 14. The workstation 10 (preferably a SUN MICROSYSTEMS SPARCstation II computer manufactured by Sun Microsystems Inc. of Mountain View, Calif.) includes a monitor 17, keyboard 18 and digitizing pad 20 (Wacomb Digitizer SD422-L), with accompanying stylus 22, coupled to a processing unit 16.

The film reader unit 12 digitizes images from a variety of media, including negative, reversal, and lithographic films, with a curved bed scanner unit (not shown) that simultaneously produces separate red, green and blue image signals. The scanner unit incorporates the use of a charge coupled device (CCD) having 8,000 pixel elements and integral color filters to perform the scanning operation in a conventional manner. The red, green and blue image signals generated by the film reader unit 12 are supplied to the processing unit 16 for image enhancement processing.

The write unit 14 includes a Xenon arc lamp to generate a white light which in turn is separated into red, green and blue spectral channels. The light from the spectral channels is focused into fiber-optic cables and conveyed to PLZT electro-optic modulators. The light passing through the electro-optic modulators are combined to produce a spot of light with the optical power required to write digital color images at 1000 pixels per inch. The electro-optic modulators contained within the write unit 14 are controlled by signals received from the processing unit 16.

In operation, the processing unit 16 generates and displays a video image representation of the original image on the monitor 17 based on the red, green and blue image signals supplied by the film reader unit 12. An operator utilizes the keyboard 18 and digitizing pad 20 to provide command signals to the processing unit 16 in order to perform a plurality of editing functions. The command signals may alternatively be entered by a mouse device (not shown) if desired. The editing functions include:

CROP—eliminates unwanted portions of image edges;
REPLICATE—permits the "stretching" of an image by repetition of selected portions;
SIZE CHANGE—magnifies image size by a specified factor;
MASK—defines "regions of interest" by boundary specifications;
CUT—extract a select image portion;
PASTE—combine one image with another;
COLOR BALANCE—change overall image color;
CONTRAST—manipulate contrast curves;
HUE/CHROMA/LIGHTNESS—independent control of color quantities; and
AIRBRUSH—permits selected portions of the image to be retouched.

The processing unit 16 modifies the image displayed on the monitor 17 based on the command signals entered by the operator and displays the modified or enhanced image on the monitor 17. The operator can make additional changes to the enhanced image until satisfied with the overall appearance of the image presented on the monitor 17. Once satisfied, the operator enters a write command signal to the processing unit 16 to print or write the displayed image in hard copy form. The processing unit 16 controls the operation of the write unit 14 in response to the write command signal to generate the hard copy reproduction of the image displayed on the monitor 17. A more detailed explanation of the operation of the electronic image reproduction system is provided in U.S. Pat. No. 4,979,032 issued to Alessi et al. on Dec. 18, 1990, U.S. Pat. No. 4,958,220 issued to Alessi et al. on Sep. 18, 1990, and U.S. Pat. No. 5,276,510 entitled "Airbrush Modeling Routine for an Electric Image Reproduction System", the contents of which are hereby incorporated by reference.

Using the MASK command, the operator enters the coordinates of a particular area of a displayed image in which a modeling computation is to be performed by pressing the stylus 22 against the working surface of the digitizing pad 20. The digitizing pad 20 generates digital signals representative of the coordinate location of the stylus 22 on the surface of the pad and provides the signals to the processing unit 16. It will be understood that other types of pointing devices, such as a mouse, touch sensitive screen, etc., can be used in place of the digitizing pad 20 and stylus 22 to define the coordinate information. Coordinate data can be alternatively entered via the keyboard 18.

Once the mask area is defined, the operator proceeds to specify the optical axis, the projection point, the density contour shape, the density gradient profile and preferably a tension factor which will be discussed in greater detail below. The processing unit 16 then calculates the necessary mask values and displays the result on the display. The operator can alter the displayed image if desired by re-specifying one or more of the parameters previously entered or by entering a noise factor which the processing unit 16 uses to modify the mask values.

Figure 8:
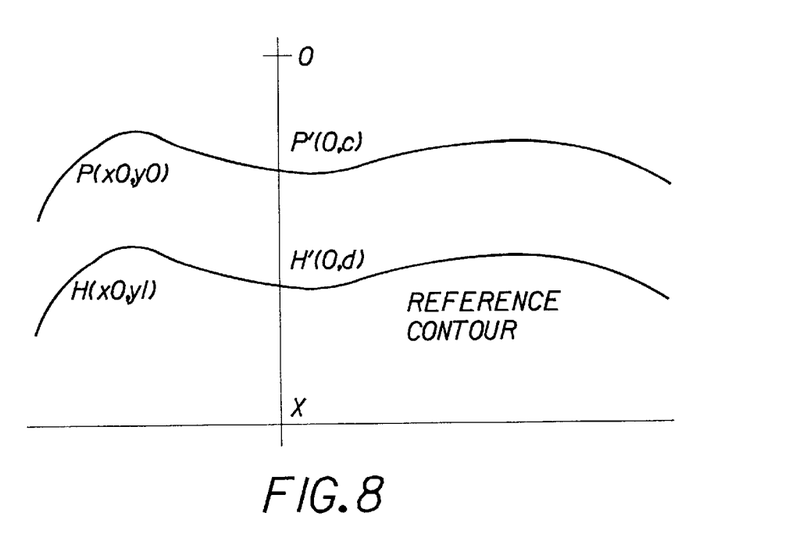
FIG. 8 illustrates the computation of mask values with a projection point at infinity.

The computations performed by the processing unit 16 will be described with reference to FIGS. 8 and 9. The geometry of the situation of a projection point at infinity is shown in FIG. 8. The density of the shadow at some point $P(x0,y0)$ is computed based on a cartesian coordinate system in which the y-axis is collinear with the optical axis, and the origin is at X. The intersection of the reference contour with the y-axis, (H') is computed by evaluating its approximating polynomial at $x=0$ in the coordinate system and then using a parallel contour passing through P and intersecting the y-axis at P'. The ordinate of P' is computed for use as the independent variable in the piecewise linear density gradient function. To Find P', use the reference contour approximating polynomial at x0, the x-coordinate of P, to find point H(x0,y1). Then, distance y0–y1 must equal distance c–d, since the contours are parallel. Finally, the second order density gradient function at P' is evaluated to obtain the density value to be applied at P.

Figure 9:
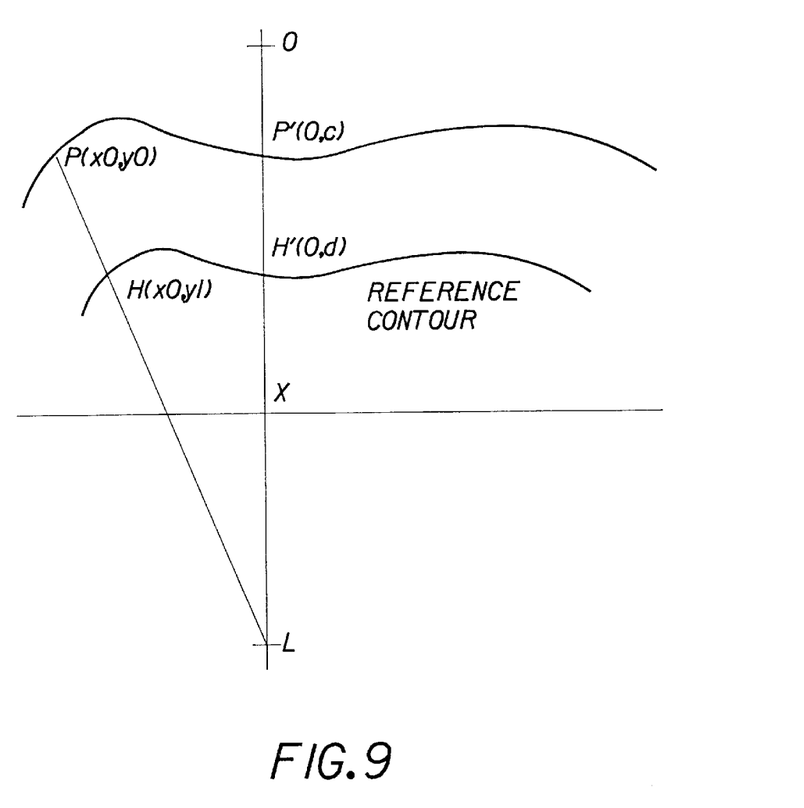
FIG. 9 illustrates the computation of mask values with a projection point at a finite distance.

The situation becomes more complex if the projection point is at a finite distance from the object as shown in FIG. 9. Using L as the projection point, the intersection of the line segment LP with the reference contour is computed. Then knowing that points P, H, and H' allows the computation of point P' using the similar triangles P'LP and H'LH. Once P' is known, the density to apply at point P is determined as in the preceding case.

The computation of the intersection of line segment LP and the reference contour involves setting the equations of the line equal to the equation for the appropriate section in the piecewise cubic spline approximation to the reference contour (Eq.1). Some complications arise in that a cubic equation with real coefficients will in general have three roots, two of which may be complex conjugates. The problem is dealt with by selecting a real root or, when more than one real root exists, finding a root whose abscissa falls within the abscissa knot interval of the cubic spline.

$$y = mx + b = c_4 x^3 + c_3 x^2 + c_2 x + c_1 \quad \text{(Eq. 1)}$$

The procedure requires that the coefficients c4, c3, c2, c1 of the pertinent portion of the piecewise cubic spline approximation to the reference contour be known. Cubic spline interpolation algorithms usually explicitly avoid computation of the coefficients of the interpolating polynomial. Rather, the tabulated knot values and the corresponding second derivatives are retained. For this reason, a routine that computes the coefficients of the interpolating polynomial is preferably used. Such a routine is provided in Section 3.5 of the publication "Numerical Recipes in C" by W. H. Press, et al., Cambridge University Press, Cambridge Mass., 1988, the contents of which are herein incorporated by reference. The routine solves a linear system of equations of the form shown in Eq. 2, where the x and y values are the coordinates of data points through which the polynomial passes, and the vector of unknowns C represents the desired coefficients of the interpolated polynomial.

$$\begin{bmatrix} 1 & x_1 & x_1^2 & x_1^3 \\ 1 & x_2 & x_2^2 & x_2^3 \\ 1 & x_3 & x_3^2 & x_3^3 \\ 1 & x_4 & x_4^2 & x_4^3 \end{bmatrix} \begin{bmatrix} c_1 \\ c_2 \\ c_3 \\ c_4 \end{bmatrix} = \begin{bmatrix} y_1 \\ y_2 \\ y_3 \\ y_4 \end{bmatrix} \quad \text{(Eq. 2)}$$

This system arises by requiring the polynomial to pass through the given points. A matrix like that shown in Eq. 2 is called a Vandermonde matrix and such a system of equations can be solve in O(N) operations. Since the computation is inherently numerically unstable, double precision arithmetic is required even to compute the coefficients of only a third order polynomial, if the polynomial is expected to pass close to the original defining points.

The shadow shape can be approximated using several different interpolation schemes, all of which exhibit slightly different behaviors and are variants of cubic spline interpolants. The most straightforward scheme entails the use of a standard Natural Cubic Spline (NCS) interpolant. This type of interpolant has been widely used for many years in various application areas. See, for example, Section 3.3 of "Numerical Recipes in C" incorporated by reference above for a concise synopsis of its implementation. Unfortunately, NCS interpolants suffer from a deficiency when used to approximate shape contours, namely, they occasionally seem to violate the implied shape or curvature of the data. Expressed more mathematically, they can introduce inflection points (points with zero second derivative) that are not mandated by the data. These extraneous inflections can be eliminated only by introducing additional data points that express the desired curvature more clearly.

A solution to the problem of NCS interpolants as discussed above was published by D. G. Schweikert in a paper entitled "An Interpolation Curve Using a Spline in Tension", J. Mathematics and Physics, Vol. 45, No. 3, September 1966, pp. 312–317, the contents of which are herein incorporated by reference. The solution, "splines under tension", involves conceptually "pulling" on the ends of the interpolation curve, with increasing force, until the extraneous inflection points have been straightened. Schweikert's presentation of the tensioned spline uses the simplifying assumption of unitary spaced x intervals, which is unsuitable for shadow modeling. The formulation of tensioned splines to allow arbitrary x intervals, however, was generalized by A. K. Cline in a publication entitled "Scalar and Planar Valued Curve Fitting Using Splines Under Tension", Communications of the ACM, Vol. 17, No.4 April 1974, pp. 218–223, the contents of which are herein incorporated by reference.

Cline also introduced a further extension that overcomes a more subtle but still very important restriction of the schemes discussed above, namely, both NCS and standard tensioned splines are limited to interpolation of data set representing functions. Many practical applications of the invention, however, will require contours that are not functions in any coordinate system, and some applications may require closed curves. A portrait vignette, for example, may require a circular vignette mask that fades out from the middle. The generalization that eliminates the functional restriction is the concept of parameterized splines, in which the data pair coordinates x,y are each interpolated separately as a function of a parameter s, which is the polygonal arc length of the polygon joining the ordered data points. The parameterized spline form allows arbitrary shaped contours, including closed and even overlapping contours.

In the work of both Schweikert and Cline, the tension factor is a prior parameter of the interpolation. As the tension is changed, the appearance of the interpolation changes. As the tension approaches zero, the interpolation becomes identical to the NCS interpolation. As the tension goes toward infinity, the interpolation becomes piecewise linear. The invention provides a user control for the global setting of tension, i.e., the user enters the parameter via the keyboard 18 and can therefore cause the production of a variety of interpolants with a given set of coordinate data points to achieve the desired results.

A preferred function used to create shadow masks is illustrated in Eq. 3, in which given data points xi and yi, with i ranging from 1 to n, and with hi equal to the x interval size and $\sigma$ representing the tension factor. The derivatives of f" are the quantities that must be calculated in order to fit a spline to the given data points.

$$f(x) = \left[ \frac{f''(x_i)}{\sigma^2} \right] \frac{\sinh(\sigma(x_{i+1} - x))}{\sinh(\sigma h_i)} + \left[ y_i - \frac{f''(x_i)}{\sigma^2} \right] \left( \frac{x_{i+1} - x}{h_i} \right) + \\ \left[ \frac{f''(x_{i+1})}{\sigma^2} \right] \frac{\sinh(\sigma(x - x_i))}{\sinh(\sigma h_i)} + \left[ y_{i+1} - \frac{f''(x_{i+1})}{\sigma^2} \right] \left( \frac{x - x_i}{h_i} \right) \quad \text{(Eq. 3)}$$

To compute these quantities, first derivatives are equated at the x data points using the adjacent splines at those points.

These constraints provide n-2 criteria and two additional criteria must be chosen, usually related to the derivatives at the extreme data points. Periodic splines can be obtained, however, by "wrapping" the boundary conditions; that is by assuming that the function value and its first two derivatives match at the first and last data points. These conditions lead naturally to a tridiagonal system of equations that can be easily solved for the derivatives. Eq. 3 is then used to actually evaluate the spline at a given value of the independent variable.

The invention provides a modeling routine that can be implemented in any type of computer or digital imaging application in which it is desirable to allow an operator to modify or create digital image data to produce effects such as, but not limited to, shadows, glows, highlights and vignettes. The invention has been described with reference to certain preferred embodiments thereof. It will be understood, however, that modifications and variations are possible within the scope of the appended claims. For example, although the preferred embodiment was discussed with reference to the use of masks to modify image data, it will be understood that the invention is not limited to the use of masks and includes direct modification of the image data.

What is claimed is:

1. An apparatus for modifying electronic image data comprising:

scanning means for generating original image data representative of an original image;

display means for receiving the original image data and displaying the original image;

data entry means for identifying a portion of the original image displayed on the display means to be modified for defining an optical axis, a projection point, a density contour shape and a density gradient profile within the identified portion of the original image, and for operator entry of a noise factor;

processing means for calculating modified image data for the identified portion based on the defined optical axis, projection point, density contour shape and density gradient for replacing a portion of the original image data representative of the identified portion of the original image with the modified image data to generate enhanced image data representative of an enhanced image, and for generating noise data based on said noise factor and for correcting the modified image data based on said noise data; and recording means for receiving the enhanced image data from the processing means and producing a hard copy of the enhanced image.

* * * * *